P. R. WERNER.
UNIVERSAL SHAFT COUPLING.
APPLICATION FILED APR. 20, 1912. RENEWED JULY 9, 1917.
1,262,151.
Patented Apr. 9, 1918.
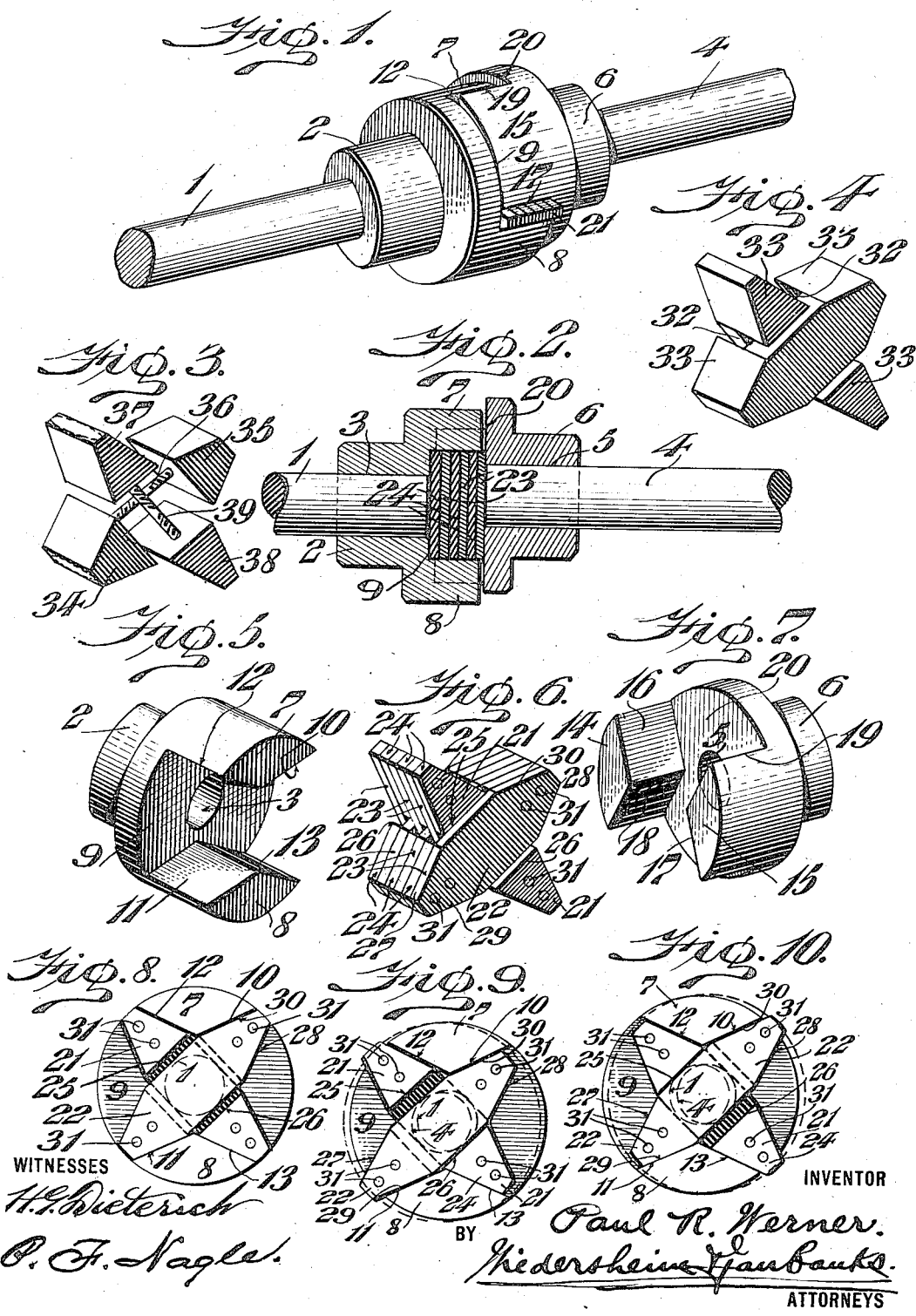

UNITED STATES PATENT OFFICE.

PAUL R. WERNER, OF PHILADELPHIA, PENNSYLVANIA.

UNIVERSAL SHAFT-COUPLING.

1,262,151.
Specification of Letters Patent.
Patented Apr. 9, 1918.

Application filed April 20, 1912, Serial No. 692,031. Renewed July 9, 1917. Serial No. 179,606.

*To all whom it may concern:*

Be it known that I, PAUL R. WERNER, a citizen of the United States, residing in the city and county of Philadelphia, State of Pennsylvania, have invented a new and useful Universal Shaft-Coupling, of which the following is a specification.

The object of my present invention is to devise a novel universal shaft coupling which will eliminate the necessity of accurately alining the shafts connected with the coupling members, which in practice necessitates a very fine adjustment of the two shafts.

A further object of my invention is to devise a coupling in which the noise is entirely eliminated, and in which the parts have a smooth sliding action.

A further object of my invention is to devise a novel insulated coupling in which the insulating material which is ordinarily of such nature that it has but slight tensile capacity, is placed under compression, and under such conditions such insulating material has the greatest capacity for resisting strains.

A further object of my invention is to devise a coupling in which each coupling member is constructed in a similar manner, and in which, if desired, each intermediate member is constructed in a similar manner.

A further object of my invention is to devise a flexible coupling which may be quickly and readily adjusted.

A further object of my invention is to devise a coupling in which intermediate members are provided, arranged at an angle to each other and free to move in the direction of their longitudinal axis.

With the above and other objects in view, which will hereinafter more clearly appear in the detailed description, my invention consists in its broad and generic scope of a novel and simplified construction of a coupling which is at all times noiseless in its operation and insulated if desired, and wherein the intermediate coupling members are at all times under compression.

It further consists of a novel construction of a coupling comprising two coupling members, each of which is constructed in a similar manner, and two intermediate members, each of which is preferably constructed in a similar manner and preferably adapted to interlock with each other.

It further consists of other novel features of construction all as will be hereinafter more clearly set forth.

For the purpose of illustrating my invention, I have shown herein certain forms thereof which are at present preferred by me, since these embodiments have been found in practice to give marked and advantageous results although it is of course to be understood that the various instrumentalities of which my invention consists can be variously arranged and organized and that my invention is not limited to the exact arrangement and organization of these instrumentalities as herein shown and described.

Figure 1 represents a perspective view of a flexible shaft coupling embodying my invention.

Fig. 2 represents a longitudinal section thereof.

Figs. 3 and 4 represent respectively, perspective views of other embodiments of intermediate coupling members which may be employed to advantage.

Fig. 5 represents a perspective view of one of the coupling members.

Fig. 6 represents a perspective view of the intermediate coupling members seen in Figs. 1 and 2.

Fig. 7 represents a perspective view of the other coupling member.

Figs. 8, 9 and 10 represent plan views of my device having one coupling member removed and showing the intermediate coupling members in the different positions they may assume under working conditions.

Similar numerals of reference indicate corresponding parts in the figures.

Referring to the drawings:—

Particular attention is directed to the fact that owing to my novel construction of intermediate coupling members and the arrangement of the end coupling members, that I am enabled to employ material which is, under ordinary conditions, impracticable to employ to transmit strains and stresses other than those of a compressive nature, but which have the property of deadening sound such as for example raw-hide, fiber, wood and other material.

1 designates a driving shaft which is secured in any desired manner to an end coupling member 2, and in the present instance such coupling member 2 is apertured as at 3, in order to receive the end of the shaft 1 which is fixed therein in any desired manner.

4 designates the driven shaft which is fixed in any desired manner in an aperture 5 of the other end coupling member 6, and each end coupling member is constructed in a similar manner. The end coupling 2 is provided with driving members 7 and 8, which project a desired distance from the end face 9 of the body portion of the coupling. The driving members 7 and 8 are formed by making a rectilinear cut across the end of the blank from which the coupling is being made thereby forming the parallel walls 10 and 11. A rectilinear cut at an angle to the first cut is then made which forms the parallel walls 12 and 13 so that each driving member has the inner walls thereof at the same angle to each other. The other end coupling member 6 is provided with driving members 14 and 15, formed in a similar manner and having their inner faces forming parallel walls 16 and 17 and the parallel walls 18 and 19, which extend outwardly from the end face 20 of the body portion of such coupling member.

The intermediate coupling members may be formed in a number of different ways and still be within the scope of my invention, and in the embodiment seen in Figs. 1, 2, 6 and 8 to 10 inclusive, I show intermediate coupling members 21 and 22, which are arranged at an angle to each other and interlock, and opposite ends of each coupling member are formed in a similar manner. In this embodiment the intermediate coupling member 21 and the intermediate coupling member 22 are duplicates, and comprise a desired number of layers or strips 23, between which are located at each end spacing strips 24 which do not extend through the center portion of the coupling member, whereby the similar strips 23 of the intermediate coupling member 21 may pass between two strips 23 of the other coupling member, as will be apparent from Fig. 6, and the amount of relative movement which one intermediate coupling member can have with respect to the other, depends upon the distance between the faces 25 and 26 of an intermediate coupling member.

The end of each intermediate coupling member converges toward its outer extremity, and the opposite side of one end as at 27 is parallel with the opposite side at the other end as at 28, while the other sides as at 29 and 30 are also parallel, in order to conform to the inner faces of the driving members 7 and 8. The parts of each intermediate coupling member are held in position by means of fastening devices 31 of any desired type, and preferably of insulating material, and since the intermediate coupling members 21 and 22 are also preferably constructed of insulating material, the end couplings will be insulated from each other, as will be evident. Since the intermediate coupling members 21 and 22 are constructed in a similar manner I have given corresponding parts the same reference characters.

In the embodiment seen in Fig. 4, I have shown another form of intermediate members, each of which is constructed in the same manner, it being understood that in this case each member is simply cut away as is indicated at 32, thereby forming the laterally extending portion 33, so that the parts will interlock and the portion 33 will prevent the undue longitudinal movement of an intermediate member, in the same manner as the spacing strips 24 limit the longitudinal movement of the members 21 and 22, seen in Fig. 6. The ends of each intermediate member seen in Fig. 4, converge toward their outer extremity and have the same contour as the ends of the intermediate members seen in Fig. 6.

In the embodiment seen in Fig. 3, I have shown intermediate members which are especially adapted to be employed in couplings of large size, in which case it is desirable to provide means for adjusting the parts, and in this embodiment all of the intermediate members have the same construction, one intermediate member being formed by the blocks 34 and 35, with which a screw 36 has threaded engagement, said screw being provided at opposite ends with threads of a different character, such as for example a right hand thread at one end and a left hand thread at the other end, so that the distance of the block 34 from the block 35 may be accurately adjusted as desired and any undue wear of the parts can be accurately taken care of. The other intermediate member is constructed of the blocks 37 and 38, and a screw 39, the parts being constructed in a similar manner to those already described, the sides of the blocks converging toward each other, and the side of one block at one end being parallel to the opposite side of the other block at the other end of the screw. It will be seen that in this embodiment the block of one intermediate coupling member contacting against the screw secured to the blocks of the other coupling members will limit the movement of the parts in the same manner as already described with reference to the other forms of intermediate coupling members already described.

It will be apparent that my novel coupling may also be run on shafts having an angular displacement, in which case the intermediate members are slightly compressed at their edges, as shown in dotted lines in Fig. 3, and in some cases it is advantageous to bevel or round off the edges shown in dotted lines which indicate the portions compressed, when the members are made of material allowing this action to take place, and it will also be apparent, if desired, the inner walls of the driving members of the end coupling members may be more or less rounded at their edges or beveled off to increase the amount of angular displacement of the shafts.

In assembling the coupling it is simply necessary to place the intermediate coupling members in position on one end coupling member, as will be understood by reference to Figs. 8, 9 and 10, and then move the other end coupling member into position so that the intermediate coupling members are interlocked between the driving members of the end parts of the coupling.

It will now be apparent that owing to the novel manner of constructing the parts, the intermediate coupling members are under compression between the driving members of the end coupling members, and that one shaft may be out of alinement with the other.

It will of course be apparent that it is not necessary in all cases to have the intermediate members interlock and this feature may be dispensed with in many cases arising in practice.

In order to more clearly set forth the novel action which takes place in my novel coupling, attention is directed to the following facts. It will be seen that the driving and driven coupling members are capable of relative lateral or transverse displacement with respect to each other, and also, if desired, are capable of relative longitudinal displacement and that the relative displacement of the coupling members, owing to the novel construction, takes place without altering or varying in any manner the relative speed of rotation of such coupling members. The coupling members are capable of relative longitudinal movement, which, in many cases arising in practice, is of marked advantage, one example of which arises when the coupling member is connected with an armature of an electric motor so that the armature is permitted to automatically center itself with respect to its magnetic field. It will also be apparent that irrespective of the number of driving members with which the coupling members are provided, and irrespective of the number of intermediate members coöperating therewith, that when the driving member is rotating in one direction one half of the number of said intermediate or spacing elements serve to transmit power, or in other words are under compression while the other half of such spacing or intermediate elements simply serve as a spacing means which prevents any back lash or lost motion when transmitting intermittent power. When the rotation of the driving coupling member is reversed, then it will be apparent that the other half of the number of spacing or intermediate elements will serve to transmit the power. In other words, the function of one half of the number of spacing or intermediate elements are reversed upon a reverse rotation of the coupling members.

It will now be apparent that I have devised a novel and useful construction of a universal shaft coupling which embodies the features of advantage enumerated as desirable in the statement of the invention and the above description, and while I have, in the present instance, shown and described preferred embodiments thereof which have been found in practice to give satisfactory and reliable results, it is to be understood that the same are susceptible of modification in various particulars without departing from the spirit or scope of the invention or sacrificing any of its advantages.

Having thus described my invention, what I claim as new and desire to secure by Letters Patent, is:—

1. In a coupling, end coupling members having a plurality of driving members extending therefrom, the inner faces of which are angularly inclined, and a plurality of relatively movable intermediate coupling members arranged at an angle to each other and located between said driving members, and the side of an intermediate coupling member at one end being parallel to the opposite side of said coupling member at its other end.

2. In a coupling, and coupling members having a plurality of driving members extending therefrom, the inner faces of which are angularly inclined, and a plurality of relatively movable intermediate interlocking coupling members arranged at an angle to each other and located between said driving members, and the side of an intermediate coupling member at one end being parallel to the opposite side of said coupling member at its other end.

3. In a coupling, end coupling members having a plurality of driving members extending therefrom, the inner faces of which are angularly inclined, and a plurality of relatively movable intermediate coupling members of insulating material arranged at an angle to each other and located between said driving members, and the side of an intermediate coupling member at one end being parallel to the opposite side of said coupling member at its other end.

4. In a coupling, end coupling members having driving members extending therefrom, the inner faces of which are angularly inclined, and the faces on one driving member being parallel to the corresponding faces on the other driving member, and relatively movable intermediate members arranged at an angle to each other and having their outer ends converging and located between the driving members of the end coupling members.

5. In a coupling, end members having driving members extending therefrom, the inner faces of which converge inwardly, and the inner faces on one driving member being parallel to faces of the other driving member, and relatively movable intermediate members having their outer ends converging and located between the driving members of said end members, and said intermediate members coacting with each other to limit the relative movement of one member with respect to the other.

6. In a coupling, end members having driving members extending therefrom, the inner faces of which are angularly inclined, and the inner faces of one member being parallel to inner faces of the other driving member, and relatively movable intermediate members arranged at an angle to each other and adapted to limit their longitudinal movement, the side of one intermediate member at one end being parallel to the opposite side of the same intermediate member at its other end.

7. In a coupling, end members having driving members extending therefrom, the inner faces of which converge inwardly, relatively movable intermediate members having their ends converging inwardly and arranged at an angle to each other and located between the driving members, and means for varying the length of an intermediate member.

8. In a coupling, end members each having two driving members extending therefrom, the inner faces of which are angularly inclined, and each inner face of one driving member being parallel to one of the inner faces of the other driving member, and relatively movable intermediate members arranged at an angle to each other and capable of relative longitudinal movement, the side of each intermediate member at one end being parallel to the opposite side of the same member at its other end, and said intermediate members being slidably arranged between the said driving members of said end members.

9. In a coupling, end members having driving lugs extending therefrom, the inner faces of which are angularly inclined, and relatively movable intermediate members each constructed in a similar manner and adapted to interlock with each other but permit relative longitudinal movement, each intermediate member having its ends converging, and the side of one member at one end being parallel to the opposite side of the same member at its opposite end, and the converging ends of an intermediate member being located between the converging faces of the driving members of the end members.

10. The combination with a driving and a driven shaft, of a coupling member secured to each shaft and provided with driving members, the driving members of one coupling member overlapping the driving members of the other coupling member, and relatively movable intermediate members arranged at right angles to each other and freely movable in the direction of their longitudinal axes, and interlocking with said coupling driving members.

11. The combination with a driving and a driven shaft, of a coupling member for each shaft, said members having overlapping driving lugs, and relatively movable intermediate members arranged at an angle to each other and freely movable in the direction of their longitudinal axes, and having their sides outwardly converging at each end and under compression between said overlapping driving lugs.

12. In a coupling, end members having overlapping driving lugs extending therefrom, the outer faces of said lugs being rounded and the inner faces thereof angularly inclined, and relatively movable intermediate members of insulating material having their ends of equal thickness and arranged at an angle to each other, said ends converging outwardly and engaging the inner faces of said driving lugs and insulating said end members from each other.

13. The combination with a driving and a driven shaft, of a coupling member for each shaft, connecting relatively movable intermediate members between said coupling members, and means for varying the length of an intermediate member.

14. The combination with a driving and a driven shaft, of a coupling member fixed at the end of each shaft and having longitudinally extending and overlapping driving lugs, the inner faces of each lug being angularly inclined, and each of said lugs having the same conformation, and relatively movable intermediate members of insulating material arranged at an angle to each other and having their ends located between adjacent lugs and under compression.

15. The combination of a driving and a driven coupling member, and connecting and relatively movable intermediate members, one half of the number of which transmit power on the rotation of the members in one direction while the other half of the number thereof serve as filling members, said intermediate members being arranged at substantially right angles to each other and having outwardly converging side walls at each end.

16. The combination of a driving and a driven coupling member, and connecting and relatively movable intermediate insulating members, one-half of the number of said intermediate members transmitting power on the rotation of the shaft in one direction, while the other half thereof serve as filling members, said intermediate members being arranged at substantially right angles to each other and having outwardly converging side walls at each end.

17. The combination of a driving and a driven coupling member, and connecting and relatively movable intermediate members, each of said members being longitudinally adjustable, and one half the number of said intermediate members transmitting power on the rotation of the coupling members in one direction, while the other half serve as filling members.

18. In a coupling, two coupling members capable of relative lateral movement, and a plurality of intermediate members, each relatively movable at an angle to each other and transversely movable at an angle to the longitudinal axis of a coupling member, and said intermediate members being in sliding engagement with the coupling members and provided at their ends with outwardly converging side walls.

19. In a coupling, coupling members relatively movable longitudinally and having at their juxtaposed ends overlapping driving elements, the side walls of which converge inwardly forming therebetween a space with angularly inclined walls, the angularity of said walls being constant in all relative positions of said members, and spacing elements in said space in frictional engagement with each other and free to move at right angles to each other.

20. In a coupling, coupling members relatively movable transversely and having at their juxtaposed ends overlapping driving elements, the side walls of which converge inwardly forming therebetween a space with angularly inclined walls, the angularity of said walls being constant in all relative positions of said members, and spacing elements in said space.

21. In a coupling, coupling members relatively movable transversely and longitudinally and having at their juxtaposed ends overlapping driving elements, the side walls of which converge inwardly forming therebetween a space with angularly inclined walls, the angularity of said walls being constant in all relative positions of said members, and spacing elements in said space.

22. The combination with driving and driven coupling members provided with overlapping driving elements having their side walls converging inwardly, of a plurality of relatively movable connecting intermediate members in frictional engagement with adjacent side walls of said driving elements capable of operation with both longitudinal and lateral relative displacement of said coupling members, without altering the relative speed of rotation thereof.

23. In a coupling, coupling members relatively movable transversely, and having at their juxtaposed ends overlapping driving elements having converging side walls forming therebetween a space with angularly inclined walls, the angularity of said walls being constant in all relative positions of said members, and spacing elements in said space and having converging side walls in frictional engagement with adjacent faces of said driving elements, one half of the number of said spacing elements transmitting power while the other half thereof serve as filling elements.

PAUL R. WERNER.

Witnesses:
H. S. FAIRBANKS,
C. D. McVAY.